US006135017A

United States Patent [19]
Wang et al.

[11] Patent Number: 6,135,017
[45] Date of Patent: Oct. 24, 2000

[54] WIRE EGG SEPARATOR

[75] Inventors: Nigel Wang, Taipei, Taiwan; Kathy Kari, Lisle, Ill.

[73] Assignee: The Pampered Chef, Ltd., Addison, Ill.

[21] Appl. No.: 09/387,368

[22] Filed: Aug. 31, 1999

[51] Int. Cl.[7] ............................... A47J 43/14; A23J 1/09
[52] U.S. Cl. ............................... 99/499; 99/497; 99/537
[58] Field of Search .......................... 99/499, 500, 497, 99/537; 30/120.1; 294/7, 8, 9, 12, 55.5, 55

[56] References Cited

U.S. PATENT DOCUMENTS

| | | | |
|---|---|---|---|
| D. 28,876 | 6/1898 | Macy | D7/667 |
| D. 29,139 | 8/1898 | Pullman | D7/667 |
| D. 136,251 | 8/1943 | Clark | D7/667 |
| D. 138,398 | 8/1944 | Reynolds | D7/667 |
| D. 218,634 | 9/1970 | Swett | D7/667 |
| D. 293,756 | 1/1988 | Benson | D7/73 |
| D. 307,527 | 5/1990 | DeCoster | D7/667 |
| D. 413,492 | 9/1999 | Wang | D7/667 |
| 621,516 | 3/1899 | Bessell . | |
| 648,598 | 5/1900 | Salomon | 99/499 |
| 941,415 | 11/1909 | Heatherington . | |
| 1,066,788 | 7/1913 | Bowen | 99/497 X |
| 1,116,988 | 11/1914 | Burke | 99/497 |
| 1,216,245 | 2/1917 | Norman . | |
| 1,262,420 | 4/1918 | Wicke | 99/499 |
| 1,282,537 | 10/1918 | Burkhart | 99/499 |
| 1,649,874 | 11/1927 | Taylor | 99/499 |
| 2,000,472 | 5/1935 | Muzzio | 99/499 |
| 2,018,162 | 10/1935 | Weldon | 99/499 |
| 2,035,065 | 3/1936 | Gray | 99/499 |
| 2,150,719 | 3/1939 | Milward | 99/499 |
| 2,187,488 | 1/1940 | Brueggeman | 99/499 |
| 2,212,502 | 8/1940 | Leahey | 99/499 |
| 2,382,222 | 8/1945 | Havas | 99/499 |
| 2,382,737 | 8/1945 | Mink | 99/499 |
| 2,430,156 | 11/1947 | Byers | 99/499 |
| 2,523,777 | 9/1950 | Polcar | 99/499 |
| 2,676,830 | 4/1954 | Lawson | 294/7 |
| 2,810,958 | 10/1957 | Monti . | |
| 3,116,770 | 1/1964 | Tanuma . | |
| 3,331,414 | 7/1967 | Dillon et al. . | |
| 3,656,525 | 4/1972 | Goodart . | |
| 3,749,001 | 7/1973 | Swett | 99/499 |
| 3,857,327 | 12/1974 | Popeil | 99/499 |
| 4,137,837 | 2/1979 | Warren | 99/499 |
| 4,463,666 | 8/1984 | Papp | 99/497 |
| 4,554,866 | 11/1985 | Hampton | 99/499 |
| 4,665,813 | 5/1987 | Maisonneuve | 99/571 |
| 5,088,392 | 2/1992 | Ancona et al. | 99/499 |
| 5,784,953 | 7/1998 | Wang | 99/499 |

*Primary Examiner*—Reginald L. Alexander
*Attorney, Agent, or Firm*—Olson & Hierl, Ltd.

[57] ABSTRACT

An egg separator made from a length of wire which has been bent and twisted to form a cup-shaped portion in which the white of the egg is separated from the yolk of the egg. The separator also includes a handle having two wire arms with bends therein defining slots which together define a clip which allows the egg separator to be rested to the rim of a bowl. The bends include arms which may be inclined at an angle relative to the handle corresponding generally to the angle at which the wall of the bowl is inclined so that the cup-shaped portion remains level in the bowl.

12 Claims, 2 Drawing Sheets

WIRE EGG SEPARATOR

TECHNICAL FIELD OF THE INVENTION

The present invention relates to an egg separator adapted to separate the white of the egg from the yolk of the egg and, more particularly, to an egg separator made of wire.

BACKGROUND OF THE INVENTION

Various types of implements have been developed and used over the years to separate the white of an egg from the yolk of the egg. A number of prior art patents disclose various structures of these egg separators including U.S. Pat. No. 1,649,874 which discloses an egg separator which is made from a length of wire material.

Egg separators of the wire type as disclosed in U.S. Pat. No. 1,649,874 have proven satisfactory because they are lightweight and further because the wire structure enhances and improves the separation of the white of the egg from the yolk of the egg in the cup of the separator.

However, a drawback associated with several of the available egg separators including the separator disclosed in U.S. Pat. No. 1,649,824 is that the hook located in front of the egg receiving basket allows only for the suspension of the egg separator across the opposite walls of a bowl. As a result, the length of the separator is a limiting factor in determining the size or diameter of the bowl which can be used.

Thus, there remains a need for an egg separator of the wire type which can be used with any size bowl regardless of the length of the egg separator.

SUMMARY OF THE INVENTION

The present invention relates to an improved egg separator of the wire type whose use is not limited either by the length of the separator or the size of the bowl upon which it is rested.

In accordance with the present invention, the egg separator comprises a length of wire which has been bent and twisted to define a cup-shaped portion for receiving the contents of an egg and a handle which includes arms with bends therein defining a clip which allows the separator to be rested over the lip or the rim of a bowl or the like receptacle.

In one embodiment of the invention, each of the bends defines a generally inverted U-shaped slot including a closed end and two spaced-apart parallel arms which are angularly oriented relative to the arms of the handle.

Further, in this embodiment, the arms of the bends extend in a direction away from the cup-shaped portion at approximately a 10 degree angle relative to the arms of the handle. In accordance with the present invention, the arms of the bends are inclined at an angle corresponding generally to the angle at which the wall of the bowl is inclined to assure that the cup-shaped portion of the separator is seated within the bowl in a generally horizontal and level orientation.

Various other objects, aims, purposes, features, advantages, embodiments, variations, and the like will be apparent to those skilled in the art form the teachings of the present specification taken with the associated drawings and the appended claims.

DESCRIPTION OF THE PREFERRED EMBODIMENT

While this invention is susceptible to embodiments in many different forms, this specification and the accompanying drawings disclose only a preferred form of the invention. This invention is not intended to be limited to the embodiment so described, however, and the scope of the invention is identified in the appended claims.

Figure 1:
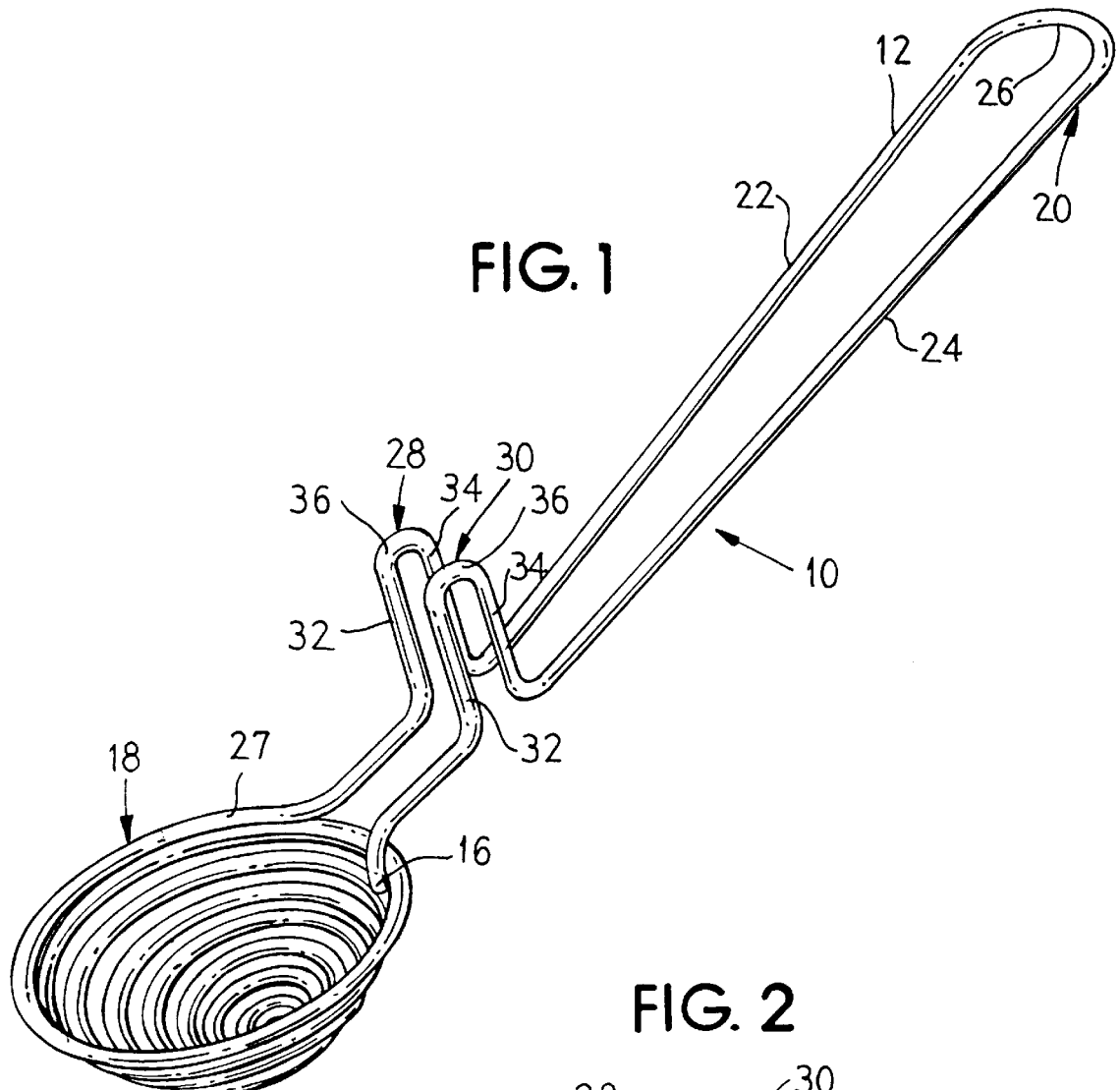
FIG. 1 is a perspective view of a wire egg separator in accordance with the present invention.
Figure 2:
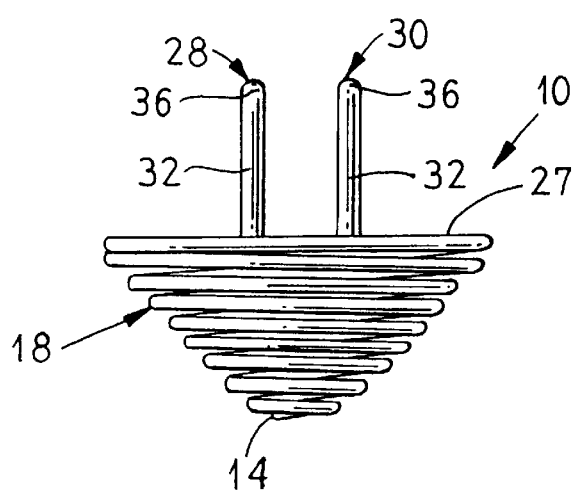
FIG. 2 is a front elevational view of the wire egg separator of FIG. 1.

An egg separator 10 constructed in accordance with the present invention is shown in FIGS. 1 and 2. In the disclosed embodiment, the egg separator 10 is made from a single elongate length of wire 12 which has opposite ends 14 and 16 and has been appropriately bent and twisted therebetween to form the various structural elements of the separator 10. The wire 12 may be made of any suitable material such as, for example, stainless steel.

The separator 10 includes a cup-shaped portion 18. The end 14 of the separator 10 forms the bottom most point of the cup-shaped portion 18 and the wire 12 is bent and twisted upwardly therefrom into a number of successive spiral convolutions of increasing diameter to form a substantially semispherically cup-shaped portion 18.

The separator 10 also includes a handle 20 comprising an element of the separator 10 where the wire 12 has been bent in the form of two elongate spaced-apart and parallel and generally co-planar arms 22 and 24 interconnected by a distal closed and generally U-shaped end 26. The arm 22 extends unitarily outwardly from, and generally co-planarly to, the uppermost convolution 27 which forms the cup-shaped portion 18. The end 16 of the wire 12 forms the end of the arm 24 and is connected, as by welding or the like, to the uppermost convolution 27 forming the cup-shaped portion 18 at a point thereof generally opposite and symmetrical to the point from which the arm 22 extends outwardly from the uppermost convolution 27.

The arms 22 and 24 include opposed, generally inverted U-shaped and upwardly extending respective bends 28 and 30. The bends 28 and 30 are located on the handle 20 proximate the cup-shaped portion 18 and each comprises two spaced-apart and generally parallel arms 32 and 34 interconnected by a generally inverted U-shaped closed end 36.

Figure 4:
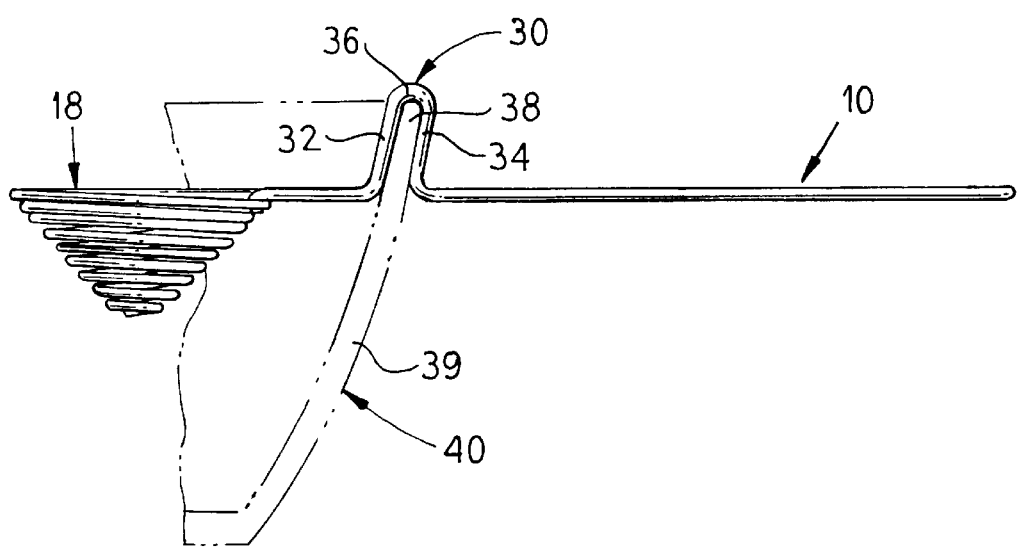
FIG. 4 is a side elevational view showing the engagement of the wire egg separator to the rim of the bowl of FIG. 3.

According to the invention, the arms 32 and 34 are aligned generally vertically co-planarly with the respective arms 22 and 24 of the handle 20 and extend upwardly and angularly therefrom. As shown in FIG. 4, in the embodiment shown, the arms 32 and 34 extend in a direction away from the cup-shaped portion 18 at approximately a ten (10) degree angle from the vertical relative to the arms 22 and 24, respectively.

Figure 3:
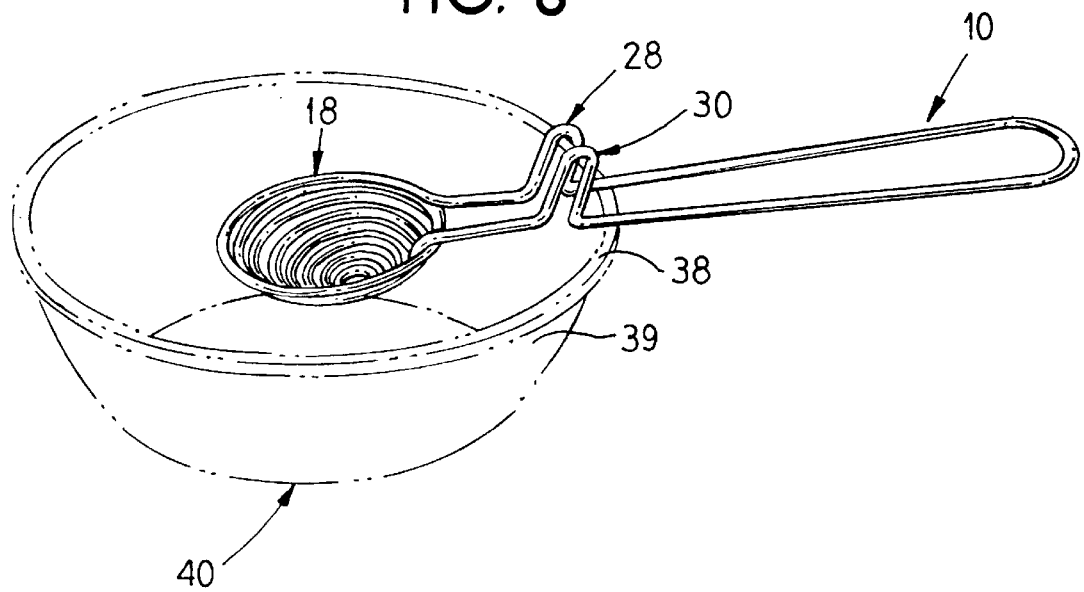
FIG. 3 is a perspective view showing the egg separator of FIG. 1 engaged to the rim of a bowl.

As shown in FIGS. 3 and 4, the bends 28 and 30 together define a clip which allows the separator 10 to be rested over the rim or lip 38 of the wall 39 of a bowl or the like receptacle 40 which receives the white of the egg separated in the cup-shaped portion 18.

As shown in FIGS. 3 and 4, the separator 10 is rested over the bowl 40 in a secure relationship wherein the closed end 36 of the respective bends 28 and 30 is positioned in abutting relationship with the lip 38 of the bowl 40 and the arms 32 and 34 of the respective bends 28 and 30 are positioned in abutting relationship with the inner and outer faces respectively of the wall 39 of the bowl 40.

In accordance with the present invention, the angle at which the arms 32 and 34 are inclined corresponds generally to the angle at which the walls of most of the bowls available today are inclined to assure that the cup-shaped portion 18 is seated within the bowl 40 in a generally level and horizontal orientation.

Unlike the wire egg separator disclosed in U.S. Pat. No. 1,649,874 which includes only a hook in front of the egg receiving cup, the use of bends 28 and 30 in the handle of the separator 10 as disclosed in the present invention allows the separator 10 to be used on any size bowl regardless of the length of the separator. The separator 10 of the present invention thus provides the benefits and advantages of an egg separator of the wire type while affording the added benefit and advantage of being usable with any size bowl. It will be readily apparent from the foregoing detailed description of the invention and from the illustrations thereof, that numerous variations and modifications may be effected without departing from the true spirit and scope of the novel concepts or principles of this invention.

What is claimed is:

1. An egg separator comprising a length of wire defining a cup-shaped portion for receiving the contents of an egg and a handle including at least two spaced arms having spaced bends therein defining a clip for engaging the rim of a receptacle to rest the egg separator on the receptacle.

2. The egg separator of claim 1 wherein the cup-shaped portion is semispherically shaped.

3. The egg separator of claim 1 wherein the bends are generally inverted U-shaped and define generally U-shaped slots.

4. The egg separator of claim 1 wherein the bends extend above the respective arms of the handle and include a closed end and two spaced-apart parallel arms which are angularly oriented relative to the arms of the handle.

5. The egg separator of claim 4 wherein the arms of the bends extend at approximately a ten (10) degree angle relative to the arms of the handle.

6. The egg separator of claim 5 wherein the arms of the bends extend in a direction away from the cup-shaped portion.

7. The egg separator of claim 1 wherein the bends in the arms of the handle are located proximate the cup-shaped portion.

8. An egg separator comprising a single length of wire defining a cup-shaped portion for receiving the contents of an egg and a handle including two arms having upwardly extending bends respectively which are angled in a direction away from said cup-shaped portion and define generally U-shaped slots which together define a clip for resting the egg separator over the wall of a receptacle.

9. The egg separator of claim 8 wherein the cup-shaped portion is semispherically shaped.

10. The egg separator of claim 8 wherein each of the bends includes two spaced-apart parallel arms extending upwardly from the arms of the handle and a generally inverted U-shaped closed end therebetween, the arms of the bends being inclined at an angle relative to the arms of the handle in a direction away from the cup-shaped portion.

11. The egg separator of claim 10 wherein the angle at which the arms of the bends are inclined corresponds generally to the angle at which the wall of the receptacle is inclined.

12. The egg separator of claim 8 wherein the bends in the arms of the handle are located proximate the cup-shaped portion.

* * * * *